(12) United States Patent
Takatori et al.

(10) Patent No.: US 9,273,156 B2
(45) Date of Patent: Mar. 1, 2016

(54) METHOD FOR PRODUCING WATER-ABSORBENT RESIN

(75) Inventors: Junichi Takatori, Himeji (JP);
Masayoshi Handa, Himeji (JP);
Kimihiko Kondo, Himeji (JP)

(73) Assignee: SUMITOMO SEIKA CHEMICALS CO., LTD., Hyogo (JP)

(*) Notice: Subject to any disclaimer, the term of this patent is extended or adjusted under 35 U.S.C. 154(b) by 197 days.

(21) Appl. No.: 13/882,314

(22) PCT Filed: Oct. 14, 2011

(86) PCT No.: PCT/JP2011/073699
§ 371 (c)(1),
(2), (4) Date: Apr. 29, 2013

(87) PCT Pub. No.: WO2012/066888
PCT Pub. Date: May 24, 2012

(65) Prior Publication Data
US 2013/0217846 A1   Aug. 22, 2013

(30) Foreign Application Priority Data
Nov. 15, 2010 (JP) ................................ 2010-254363

(51) Int. Cl.
*C08F 2/20* (2006.01)
*C08F 2/32* (2006.01)
*C08F 220/06* (2006.01)

(52) U.S. Cl.
CPC ... *C08F 2/20* (2013.01); *C08F 2/32* (2013.01); *C08F 220/06* (2013.01)

(58) Field of Classification Search
CPC ............ C08F 2/32; C08F 2/20; C08F 220/06; C08F 255/00; C08F 255/02
See application file for complete search history.

(56) References Cited

U.S. PATENT DOCUMENTS

| 4,340,706 A | 7/1982 | Obayashi |
| 4,683,274 A | 7/1987 | Nakamura |
| 2009/0182092 A1* | 7/2009 | Yokoyama et al. ........... 524/850 |
| 2009/0281247 A1* | 11/2009 | Handa et al. .................. 525/243 |
| 2010/0331802 A1 | 12/2010 | Yokoyama |

FOREIGN PATENT DOCUMENTS

| EP | 0441507 A1 | 8/1991 |
| EP | 1840137 A1 | 10/2007 |
| EP | 2014683 A1 | 1/2009 |
| EP | 2184300 A1 | 5/2010 |
| GB | 2418669 A | 4/2006 |
| JP | S56-131608 | 10/1981 |
| JP | S57-21405 | 2/1982 |
| JP | S61-87702 | 5/1986 |
| JP | H1-168703 | 7/1989 |
| JP | H5-59107 | 3/1993 |
| JP | 2006143766 A | 6/2006 |
| WO | WO 2007/126003 A1 | 11/2007 |
| WO | WO 2009/025235 A1 | 2/2009 |

OTHER PUBLICATIONS

International Search Report for International Application No. PCT/JP2011/073699 dated Nov. 8, 2011.
Supplementary European Search Report dated Feb. 18, 2014 issued in counterpart EP Patent Application No. 11842161.9.
IPOS (Intellectual Property Office of Singapore) Search Report dated Feb. 10, 2015. "SG Patent Application No. 201303024-2 corresponds to the present application."

* cited by examiner

*Primary Examiner* — Karuna P Reddy
(74) *Attorney, Agent, or Firm* — Kratz, Quintos & Hanson, LLP

(57) ABSTRACT

The present invention may provide a process for producing a water-absorbent resin by employing a reversed suspension polymerization method, by which a water-absorbent resin having a small particle size and a narrow particle size distribution can be produced. The process for producing a water-absorbent resin may include subjecting a water-soluble ethylenically unsaturated monomer to a reversed phase suspension polymerization in a petroleum hydrocarbon dispersion medium containing a surfactant and a polymeric dispersion agent, wherein the polymeric dispersion agent is a polymeric protective colloid having a weight average molecular weight (Mw) of 2,000 to 15,000 and a molecular weight distribution (Mw/number average molecular weight (Mn)) of 3 to 50.

4 Claims, No Drawings

METHOD FOR PRODUCING WATER-ABSORBENT RESIN

TECHNICAL FIELD

The present invention relates to a process for producing a water-absorbent resin. Specifically, the present invention relates to a water-absorbent resin having a small particle size and a narrow particle size distribution.

BACKGROUND ART

Water-absorbent resin has been widely used in various fields, including hygienic articles, such as disposable diapers and sanitary napkins; agricultural and horticultural materials, such as water-retaining agents and soil conditioners; and industrial materials, such as water-blocking agents and agents for preventing dew condensation.

Known types of water-absorbent resin include, for example, hydrolysates of starch-acrylonitrile graft copolymers, neutralized products of starch-acrylate graft copolymers, saponified products of vinyl acetate-acrylic ester copolymers, and crosslinked polymers of partially neutralized acrylic acid compound.

Desired properties for water-absorbent resin include, for example, the absorption properties, such as the amount of water absorption and the water-absorption rate, and a particle size that is optimal for the use of the water-absorbent resin. In particular, for hygienic articles, such as disposable diapers and sanitary napkins, it is necessary to use a water-absorbent resin having a small particle size and a narrow particle size distribution in order to exhibit satisfactory absorption properties, such as the liquid permeation time, re-wet, and dispersibility.

Examples of known methods for producing a water-absorbent resin include an aqueous solution polymerization method and a reversed suspension polymerization method. In the reversed suspension polymerization method, the use of a surfactant is necessary. A method in which a fatty acid sorbitan ester, a fatty acid sorbitol ester, or the like is used as the surfactant is known as a technique that focuses on the surfactant (Patent Literature 1). However, this method has drawbacks; for example, a stable production of a water-absorbent resin having a small particle size is difficult and intense adhesion of resin to the wall surface of polymerization equipment during production is observed.

Another production method, in which a specific fatty acid sucrose ester is used as a surfactant, is also known (Patent Literature 2). This method shows some improvement in productivity since the adhesion of resin to the wall surface of the polymerization equipment during production is prevented; however, there is room for further improvement in this method since it has problems, such as a large particle size, a wide particle size distribution, etc., in the resulting water-absorbent resin.

CITATION LIST

Patent Literature

PTL 1: Japanese Unexamined Patent Publication No. S56-131608

PTL 2: Japanese Unexamined Patent Publication No. S61-087702

SUMMARY OF INVENTION

Technical Problem

The main object of the present invention is to provide a process for producing a water-absorbent resin by a reversed suspension polymerization method through which a water-absorbent resin having a small particle size and a narrow particle size distribution can be produced.

Solution to Problem

To achieve the above objects, the present inventors conducted extensive research and, as a result, found that a water-absorbent resin having a small particle size and a narrow particle size distribution can be produced by using a reversed phase suspension polymerization method in the presence of a polymeric dispersion agent having a weight average molecular weight and a molecular weight distribution within specific ranges. The present invention has been accomplished based on the above finding and widely includes the following embodiments.

Item 1. A process for producing a water-absorbent resin comprising subjecting a water-soluble ethylenically unsaturated monomer to reversed phase suspension polymerization in a petroleum hydrocarbon dispersion medium containing a surfactant and a polymeric dispersion agent.

the polymeric dispersion agent being a polymeric protective colloid having a weight average molecular weight (Mw) of 2,000 to 15,000 and a molecular weight distribution (Mw/number average molecular weight (Mn)) of 3 to 50.

Item 2. The process for producing a water-absorbent resin according to Item 1, wherein the polymeric protective colloid is at least one member selected from the group consisting of maleic anhydride-modified polyethylene, maleic anhydride polypropylene, and maleic anhydride-modified ethylene-propylene copolymers.

Item 3. The process for producing a water-absorbent resin according to Item 1 or 2, wherein the surfactant is at least one member selected from the group consisting of fatty acid sucrose esters and polyglycerol fatty acid esters.

Item 4. The process for producing a water-absorbent resin according to any one of Items 1 to 3, wherein the water-soluble ethylenically unsaturated monomer is at least one member selected from the group consisting of (meth)acrylic acids and salts thereof.

Advantageous Effects of Invention

The production process of the present invention allows a water-absorbent resin having a small particle size and a narrow particle size distribution to be easily produced using a reversed suspension polymerization method.

DESCRIPTION OF EMBODIMENTS

The production process for producing a water-absorbent resin of the present invention is such that a water-soluble ethylenically unsaturated monomer is subjected to reversed phase suspension polymerization in a petroleum hydrocarbon dispersion medium containing a surfactant and a polymeric dispersion agent to form a water-absorbent resin, wherein a polymeric protective colloid having a weight average molecular weight (Mw) of 2,000 to 15,000 and a molecular weight distribution (Mw/number average molecular weight (Mn)) of 3 to 50 is used as the polymeric dispersion agent.

The weight average molecular weight (Mw) and number average molecular weight (Mn) of the polymeric protective colloid were measured using a high temperature gel permeation chromatograph.

By using a polymeric protective colloid having a weight average molecular weight (Mw) that satisfies the above-specified range, the dispersion stability of the water-soluble ethylenically unsaturated monomer in a petroleum hydrocarbon dispersion medium can be maintained in the reversed suspension polymerization method. Preferably, the polymeric protective colloid satisfies the condition of a weight average molecular weight (Mw) within the range of 2,000 to 10,000.

Having a weight average molecular weight of 2,000 or more can prevent the resulting water-absorbent resin from being fine particles, and having a weight average molecular weight of 15,000 or less can prevent the particle size of the resulting water-absorbent resin from becoming unduly large.

Using a polymeric protective colloid satisfying the aforementioned range of molecular weight distribution (Mw/number average molecular weight (Mn)) makes it possible to produce a water-absorbent resin having a narrow particle size distribution. Preferably, the polymeric protective colloid satisfies the condition of a molecular weight distribution range of 5 to 45.

By setting the molecular weight distribution to 3 or greater, a water-absorbent resin having a small particle size can be stably produced. By setting the molecular weight distribution to 50 or less, the resulting water-absorbent resin can be prevented from having a wide particle size distribution.

The present invention makes it possible to produce a water-absorbent resin having a small particle size and a narrow particle size distribution employing a reversed suspension polymerization method by satisfying the conditions of the aforementioned ranges of the weight average molecular weight and molecular weight distribution.

The polymeric protective colloid used in the production process of the present invention is not particularly limited, and usable examples thereof include maleic anhydride-modified polyethylene, maleic anhydride-modified polypropylene, maleic anhydride-modified ethylene-propylene copolymers, maleic anhydride-modified EPDM (ethylene-propylene-diene terpolymer), maleic anhydride-modified polybutadiene, ethylene-maleic anhydride copolymers, ethylene-propylene-maleic anhydride copolymers, butadiene-maleic anhydride copolymers, oxidized polyethylene, ethylene-acrylic acid copolymers, ethyl cellulose, and ethyl hydroxyethyl cellulose. These polymeric protective colloids may be used alone or in a combination of two or more.

Of these, maleic anhydride-modified polyethylene, maleic anhydride-modified polypropylene, and maleic anhydride-modified ethylene-propylene copolymers, are preferably used as a polymeric protective colloid from the viewpoint of the dispersion stability of a water-soluble ethylenically unsaturated monomer.

The amount of the polymeric protective colloid used is not particularly limited. The polymeric protective colloid is generally used in an amount of 0.05 to 5 parts by mass, and preferably 0.1 to 3 parts by mass relative to 100 parts by mass of the monomers in order to maintain an excellent dispersion state of the water-soluble ethylenically unsaturated monomer in the petroleum hydrocarbon dispersion medium, and to obtain a dispersion effect that corresponds to the amount used.

The water-soluble ethylenically unsaturated monomer used in the production process of the present invention is not particularly limited, and usable examples include (meth) acrylic acid (herein "acryl" and "methacryl" collectively refer to "(meth)acryl;") and salts thereof; 2-(meth)acrylamide-2-methylpropanesulfonic acid and salts thereof; nonionic monomers, such as (meth)acrylamide, N,N-dimethyl(meth) acrylamide, 2-hydroxyethyl(meth)acrylate, N-methylol (meth)acrylamide, and polyethylene glycol mono(meth) acrylate; amino-group-containing unsaturated monomers, such as N,N-diethylaminoethyl (meth)acrylate, N,N-diethylaminopropyl(meth)acrylate, diethylaminopropyl(meth) acrylamide, and quaternary compounds thereof. These water-soluble ethylenically unsaturated monomers may be used alone or in a combination of two or more.

Among these, acrylic acid, salts thereof, methacrylic acid, salts thereof, acrylamide, methacrylamide, N,N-dimethylacrylamide, and the like are preferably used as a water-soluble ethylenically unsaturated monomer because they are easily available industrially. The use of acrylic acid, salts thereof, methacrylic acid, salts thereof, etc., is more preferable.

The aforementioned water-soluble ethylenically unsaturated monomers may be used in the form of an aqueous solution in order to more effectively disperse them in a petroleum hydrocarbon dispersion medium in the reversed suspension polymerization method. The concentration of the monomer in the aqueous monomer solution is not particularly limited, and it is preferably 20% by mass to a saturated concentration, more preferably 25 to 70% by mass, and even more preferably 30 to 55% by mass.

When the water-soluble ethylenically unsaturated monomer contains an acid group such as (meth)acrylic acid or 2-(meth)acrylamide-2-methylpropanesulfonic acid, the acid group may be neutralized in advance with an alkaline neutralizing agent. The alkaline neutralizing agent is not particularly limited, and usable examples thereof include aqueous solutions of alkali metal compounds such as sodium hydroxide and potassium hydroxide, and ammonia. These alkaline neutralizing agents may be used alone or in a combination of two or more.

The degree of neutralization of all the acid groups with the alkaline neutralizing agent is not particularly limited, and is generally 10 to 100% by mol, and preferably 30 to 80% by mol from the viewpoint of increasing the osmotic pressure of the resulting water-absorbent resin to increase the absorption property, and not causing any disadvantages in safety or the like due to the presence of an excess alkaline neutralizing agent.

The surfactant used in the production process of the present invention is not particularly limited, and examples thereof include the nonionic surfactant, such as sucrose fatty acid esters, polyglycerol fatty acid esters, sorbitan fatty acid esters, polyoxyethylene sorbitan fatty acid esters, polyoxyethylene glycerol fatty acid esters, sorbitol fatty acid esters, polyoxyethylene sorbitol fatty acid esters, polyoxyethylene alkyl ethers, polyoxyethylene alkylphenyl ethers, polyoxyethylene castor oil, polyoxyethylene cured castor oil, alkylallylformaldehyde condensed polyoxyethylene ethers, polyoxyethylene polyoxypropylene block copolymers, polyoxyethylene polyoxypropyl alkyl ethers, polyethylene glycol fatty acid esters, alkyl glucosides, N-alkyl glucone amides, polyoxyethylene fatty acid amides, polyoxyethylene alkylamines, phosphoric esters of polyoxyethylene alkyl ethers, and phosphoric esters of polyoxyethylene alkylallyl ethers. These surfactants may be used alone or in a combination of two or more.

Of these, from the viewpoint of the dispersion stability of a water-soluble ethylenically unsaturated monomer in a petroleum hydrocarbon dispersion medium, the use of a sucrose fatty acid ester, a polyglycerol fatty acid ester, and the like as a surfactant is preferable.

The amount of the surfactant used is not particularly limited. In order to maintain an excellent dispersion state of the water-soluble ethylenically unsaturated monomer in the petroleum hydrocarbon dispersion medium, and to obtain a dispersion effect that corresponds to the amount used, the amount of the surfactant is generally 0.05 to 5 parts by mass, and 0.1 to 3 parts by mass relative to 100 parts by mass of the monomers.

The petroleum hydrocarbon dispersion medium used in the present invention is not particularly limited, and examples thereof include aliphatic hydrocarbons, such as n-hexane, n-heptane, n-octane, and ligroin; alicyclic hydrocarbons, such as cyclopentane, methylcyclopentane, cyclohexane, and methylcyclohexane; and aromatic hydrocarbons, such as benzene, toluene, and xylene. These petroleum hydrocarbon dispersion mediums may be used alone or in a combination of two or more.

Of these, n-hexane, n-heptane, and cyclohexane are preferably used as the petroleum hydrocarbon dispersion medium because they are easily available industrially, stable in quality, and inexpensive. From the viewpoint of the same, as an example of a combination of the above, Exxsol™ Heptane Fluid is commercially available (produced by ExxonMobil Co., Ltd.: containing 75-85% by mass n-heptane and isomers) are preferably used.

The amount of petroleum hydrocarbon dispersion medium used is not particularly limited, and is generally 50 to 600 parts by mass and preferably 100 parts by mass relative to 100 to 550 parts by mass of the monomer in order to easily release the heat generated during polymerization and to readily control the reaction temperature in the reversed suspension polymerization process.

In the production process of the present invention, generally 10 to 200 parts by mass of water is used relative to 100 parts by mass of the petroleum hydrocarbon dispersion medium. When the amount of water is less than 10 parts by mass, the efficiency of industrial production will be poor, thus making it undesirable from an economical point of view. When the amount of water exceeds 200 parts by mass, it adversely affects the dispersion state of the water-soluble ethylenically unsaturated monomer, and the resulting water-absorbent resin may have an unduly large particle size.

In the production process of the present invention, a crosslinking agent may be added, if necessary, when the water-soluble ethylenically unsaturated monomer is subjected to reversed phase suspension polymerization. There is no particular limitation to the crosslinking agent, and compounds having two or more polymerizable unsaturated groups can be used. Examples of the crosslinking agent include di- or tri-(meth)acrylate esters of polyols such as (poly)ethylene glycol (in this specification, "polyethylene glycol" and "ethylene glycol" collectively refer to "(poly) ethylene glycol;", (poly)propylene glycol, trimethylolpropane, glycerol polyoxyethylene glycol, polyoxypropylene glycol, and (poly)glycerol; unsaturated polyesters obtained by reacting the above-mentioned polyol with an unsaturated acid, such as maleic acid and fumaric acid; bisacrylamides, such as N,N'-methylenebis(meth)acrylamide; di- or tri(meth) acrylate esters obtained by reacting a polyepoxide with (meth)acrylic acid; carbamyl esters of di(meth)acrylic acid obtained by reacting a polyisocyanate, such as tolylenediisocyanate or hexamethylenediisocyanate, with hydroxyethyl (meth)acrylate; allylated starch; allylated cellulose; diallyl phthalate; N,N',N"-triallyl isocyanurate; and divinylbenzene.

In addition to the aforementioned compounds having two or more polymerizable unsaturated groups, compounds having two or more other reactive functional groups can be used as the crosslinking agent. Examples thereof include glycidyl-group-containing compounds, such as (poly)ethylene glycol diglycidyl ethers, (poly)propylene glycol diglycidyl ethers, and (poly)glycerol diglycidyl ethers; (poly)ethylene glycol; (poly)propylene glycol; (poly)glycerol; pentaerythritol; ethylenediamine; polyethyleneimine; and glycidyl(meth)acrylate. These crosslinking agents can be used alone or in a combination of two or more.

Among these, (poly)ethylene glycol diglycidyl ethers, (poly)propylene glycol diglycidyl ethers, (poly)glycerol diglycidyl ethers, N,N'-methylenebisacrylamide are preferably used as the crosslinking agent because they have excellent reactivity at a low temperature.

In order to efficiently render the effect of the crosslinking agent, it is preferable that the crosslinking agent be added to the water-soluble ethylenically unsaturated monomer and used.

The amount of the crosslinking agent used is not particularly limited, and is generally 0 to 1% by mol, and preferably 0.0001 to 0.5% by mol relative to the total amount of the monomers used in order to sufficiently improve the absorption properties of the water-absorbent resin.

The addition of the crosslinking agent can be freely determined because the absorption properties of the water-absorbent resin may also be controlled by subjecting the surface and area near the surface of the water-absorbent resin to crosslinking in any step from after monomer polymerization to drying.

In the production process of the present invention, the reaction of the reversed suspension polymerization method is usually performed using a radical polymerization initiator. There is no particular limitation to the radical polymerization initiator, and examples thereof include persulfates, such as potassium persulfate, ammonium persulfate, and sodium persulfate; peroxides, such as methyl ethyl ketone peroxide, methyl isobutyl ketone peroxide, di-t-butyl peroxide, t-butyl cumyl peroxide, t-butyl peroxyacetate, t-butyl peroxyisobutylate, t-butyl peroxypivalate, and hydrogen peroxide; and azo compounds, such as 2,2'-azobis(2-amidinopropane)dihydrochloride, 2,2'-azobis[2-(N-phenylamidino)propane]dihydrochloride, 2,2'-azobis[2-(N-allylamidino)propane]dihydrochloride, 2,2'-azobis{2-[1-(2-hydroxyethyl)-2-imidazoline-2-yl]propane}dihydrochloride, 2,2'-azobis{2-methyl-N-[1,1-bis(hydroxymethyl)-2-hydroxyethyl] propionamide}, 2,2'-azobis[2-methyl-N-(2-hydroxyethyl)-propionamide], and 4,4'-azobis(4-cyanovaleric acid). These radical polymerization initiators can be used alone or in a combination of two or more.

The amount of the radical polymerization initiator used is not particularly limited, and is generally 0.005 to 1% by mol relative to the total amount of the monomer. When the amount of the radical polymerization initiator is less than 0.005% by mol, the polymerization reaction takes too long, and is thus not desirable. When the amount of the radical polymerization initiator exceeds 1% by mol, an abrupt polymerization reaction occurs, and is thus not desirable.

The radical polymerization initiator can also be used as a redox polymerization initiator together with a reducing agent, such as sodium sulfite, sodium hydrogen sulfite, ferrous sulfate, and L-ascorbic acid.

In the production process of the present invention, the reaction temperature of the reversed suspension polymerization method depends on the type of radical polymerization initiator used, and is generally 20 to 110° C., and preferably 40 to 90° C. When the reaction temperature is lower than 20° C., the polymerization rate becomes slow and polymerization takes too long, making it economically undesirable. When the reaction temperature is higher than 110° C., it becomes difficult to release the heat generated in the polymerization, so there are difficulties in achieving a smooth reaction. The reaction time is generally 0.1 to 4 hours.

After the polymerization reaction has completed in the manner described above, water and the dispersion medium are removed therefrom and the water content in the resulting water-absorbent resin is appropriately adjusted in a drying step or the like. Additives, such as a lubricant, a deodorizer, and an antimicrobial agent, may be further added according to the application.

The water-absorbent resin obtained by the process of the present invention generally has a uniformity degree of particle size distribution of 1.0 to 2.3 and preferably 1.0 to 2.1. When the water-absorbent resin is used, for example, as an absorbent material, it is not preferable to use large particles in a large amount because the absorbent material after compression becomes partially rigid. It is also not preferable to use small particles in a large amount, because the particles are likely to move in a thin absorbent material, and uniformity is impaired. Therefore, the water-absorbent resin used in an absorbent material preferably has a narrow particle size distribution, in other words, a small uniformity degree of particle size distribution. The uniformity degree can be measured by the methods used in the Examples described below.

EXAMPLES

The present invention is described in further detail below based on Examples and Comparative Examples. However, the present invention is not limited to these Examples.

The absorption capacity of saline solution, median particle size, and uniformity degree of particle size distribution of each water-absorbent resin obtained in Examples and Comparative Examples were evaluated by using the methods explained below.

Absorption Capacity of Saline Solution 500 g of 0.9% by mass sodium chloride aqueous solution (physiological saline solution) was weighed and placed in a 500-mL beaker. 2.0 g of water-absorbent resin was dispersed therein in such a manner that unswollen lump was not observed. The solution was left to stand for 60 minutes in a stirred state to sufficiently swell the water-absorbent resin. The contents of the beaker were filtered through a JIS-standard sieve having an opening of 75 μm whose mass Wa (g) had been measured in advance. The sieve was inclined at an angle of about 30 degrees relative to the horizon, and left to stand in that state for 30 minutes so as to filter out excess water. The mass Wb (g) of the sieve having water-absorbing gel therein was measured, and the absorption capacity of saline solution was determined by the following formula.

Absorption capacity of saline solution (g/g)=[$Wb-Wa$] (g)/mass of the water-absorbent resin(g)

Median Particle Size 0.25 g of amorphous silica (Degussa Japan, Sipernat 200) was mixed as a lubricant with 50 g of a water-absorbent resin to obtain a water-absorbent resin for measurement. JIS-standard sieves having openings of 500 μm, 250 μm, 180 μm, 150 μm, 106 μm, 75 μm, and 38 μm, and a receiving tray were combined in that order. The above-mentioned water-absorbent resin was placed on the top sieve, and shaken for 20 minutes using a Ro-Tap Sieve Shaker.

After performing sieving by shaking, the mass of the water-absorbent resin remaining on each sieve was calculated as the mass percentage relative to the total mass, and the mass percentage was integrated in descending order of particle size. Thereby, the relationship between the sieve opening and the integrated value of the mass percentage of the water-absorbent resin remaining on the sieve was plotted on a logarithmic probability paper. By connecting the plots on the probability paper with a straight line, the particle size corresponding to the 50% percentile of the integrated mass percentage was defined as the median particle size.

Uniformity Degree of Particle Size Distribution

In the measurement of the median particle size, a particle size (X1) corresponding to the 15.9% percentile of the integrated mass percentage and a particle size (X2) corresponding to the 84.1% percentile of the integrated mass percentage were determined, and the uniformity degree was obtained by the following formula.

Uniformity degree=$X1/X2$

Specifically, when the particle size distribution is narrow, the uniformity degree is close to 1, whereas when the particle size distribution is broad, the uniformity degree is greater than 1.

Weight Average Molecular Weight, Number Average Molecular Weight, and Molecular Weight Distribution The weight average molecular weight (Mw) and number average molecular weight (Mn) of the polymeric protective colloids used in Examples and Comparative Examples were measured to calculate the molecular weight distribution (Mw/Mn). The measurement was conducted using a high-temperature gel permeation chromatograph under the conditions described below. Table 1 shows the results.

Device: HLC-8121GPC/HT (Detector: RI)
Column: TSKgel GMHHR–H(20)HT+G2000HHR(20) HT×two columns (7.8 mmID×30 cm, produced by TOSO Corporation)
Eluent: Dibutylhydroxytoluene was added to HPLC-grade 1,2,4,-trichlorobenzene (produced by Wako Pure Chemical Industries, Ltd.) as a stabilizer (0.05 parts by mass of dibutylhydroxytoluene relative to 100 parts by mass of 1,2,4,-trichlorobenzene)
Flow rate: 1.0 mL/min
Detection condition: polarity (−)
Injection volume: 0.3 mL
Column temperature: 140° C.
System temperature: 40° C.

TABLE 1

| | Components | Weight average molecular weight Mw | Number average molecular weight Mn | Molecular weight distribution Mw/Mn |
|---|---|---|---|---|
| Polymeric protective colloid A | Maleic anhydride-modified ethylene-propylene copolymer | 5619 | 561 | 10.0 |

TABLE 1-continued

| Components | | Weight average molecular weight Mw | Number average molecular weight Mn | Molecular weight distribution Mw/Mn |
|---|---|---|---|---|
| Polymeric protective colloid B | Maleic anhydride-modified polyethylene | 8274 | 668 | 12.4 |
| Polymeric protective colloid C | Maleic anhydride-modified polyethylene | 4036 | 92 | 43.9 |
| Polymeric protective colloid D | Low-molecular polyethylene | 1783 | 645 | 2.8 |
| Polymeric protective colloid E | Polar polyethylene wax | 3106 | 57 | 54.5 |
| Polymeric protective colloid F | Maleic anhydride-modified polyethylene | 18168 | 1211 | 15.0 |

Example 1

A 2 L cylindrical round-bottomed separable flask equipped with a stirrer, two pitched paddle impeller, a reflux condenser, a dropping funnel, and a nitrogen gas inlet tube was provided. 286 g of n-heptane and 0.92 g of a sucrose stearate having an HLB of 3 (produced by Mitsubishi-Kagaku Foods Corporation, Ryoto sugar ester S-370) were put into this flask, and 0.092 g of polymeric protective colloid A (produced by Mitsui Chemicals, Inc., Hi-wax 2203A) was added thereto. The temperature was raised to 80° C. while stirring to dissolve the surfactant and polymeric protective colloid A. Thereafter, the resulting solution was cooled to 50° C.

92 g of 80% by mass an acrylic acid aqueous solution (1.02 mol) was put into an Erlenmeyer flask (500-ml capacity), and 146.0 g of 21% by mass sodium hydroxide aqueous solution was added dropwise thereto under external cooling to neutralize the solution to 75% by mol. 0.11 g of potassium persulfate (0.41 mmol) as a radical polymerization initiator and 9.2 mg of N,N'-methylenebisacrylamide (0.06 mmol) as an crosslinking agent were added, thereby preparing an aqueous monomer solution.

The total amount of the aqueous monomer solution was put into a separable flask. The mixture was kept at 35° C. and suspended while being stirred. After substantially replacing the inside of the system with nitrogen, the flask was immersed in a water bath at 65° C. to raise the temperature, and reversed phase suspension polymerization was performed for 30 minutes. After the completion of the polymerization reaction, the result slurry was subjected to the azeotropic distillation of water and n-heptane using an oil bath at 120° C. to distill off only water to the outside of the system. Subsequently, n-heptane was evaporated to dry the result slurry, obtaining 95.4 g of water-absorbent resin. Table 2 shows the measured results of each property of water-absorbent resin obtained.

Example 2

The same procedure as in Example 1 was repeated except that polymeric protective colloid B (produced by Honeywell International Inc., A-C575A) was used instead of polymeric protective colloid A, obtaining 95.6 g of water-absorbent resin. Table 2 shows the measured results of each property of water-absorbent resin obtained.

Example 3

The same procedure as in Example 1 was repeated except that polymeric protective colloid C (produced by Sanyo Chemical Industries, Ltd., SANWAX E310) was used instead of polymeric protective colloid A and the amount of the polymer protective colloid was changed to 0.28 g, obtaining 95.2 g of water-absorbent resin. Table 2 shows the measured results of each property of water-absorbent resin obtained.

Comparative Example 1

The same procedure as in Reference Example 3 was repeated except that polymeric protective colloid D (produced by Mitsui Chemicals, Inc., Hi-wax 110P) was used instead of polymeric protective colloid C, obtaining 96.0 g of water-absorbent resin. Table 2 shows the measured results of each property of water-absorbent resin obtained.

Comparative Example 2

The same procedure as in Example 3 was repeated except that polymeric protective colloid E (produced by Clariant, Licowax PED522) was used instead of polymeric protective colloid C, obtaining 95.5 g of water-absorbent resin. Table 2 shows the measured results of each property of water-absorbent resin obtained.

Comparative Example 3

The same procedure as in Example 3 was repeated except that polymeric protective colloid F (produced by Sanyo Chemical Industries, Ltd., YOUMEX 2000) was used instead of polymeric protective colloid C, obtaining 95.7 g of water-absorbent resin. Table 2 shows the measured results of each property of water-absorbent resin obtained.

TABLE 2

| | Physiological saline solution absorption capacity [g/g] | Median particle size [μm] | Uniformity Degree | | |
|---|---|---|---|---|---|
| | | | X1 [μm] | X2 [μm] | X1/X2 |
| Example 1 | 60 | 165 | 198 | 127 | 1.56 |
| Example 2 | 63 | 154 | 205 | 113 | 1.81 |
| Example 3 | 59 | 160 | 211 | 112 | 1.88 |
| Comparative Example 1 | 63 | 57* | 87 | 31 | 2.81 |
| Comparative Example 2 | 66 | 198 | 278 | 84 | 3.31 |
| Comparative Example 3 | 60 | 279 | 335 | 139 | 2.41 |

*Partial agglomerate was observed.

As is clear from Table 2, the water-absorbent resins obtained in Examples 1 to 3 had an appropriately small median particle size and a narrow particle size distribution.

In contrast, in the Comparative Examples, when the polymeric protective colloids had a weight average molecular weight of less than 2,000 and a molecular weight distribution of less than 3 (Comparative Example 1), the median particle size became unduly small, the particle size distribution was wide, and the reversed phase suspension polymerization was unstable, forming partial agglomerate. When the polymer protective colloid had a molecular weight distribution exceeding 50 (Comparative Example 2), the particle size distribution became wide. When the polymer protective colloid had a weight average molecular weight exceeding 15,000 (Comparative Example 3), the median particle size became unduly large.

The invention claimed is:

1. A process for producing a water-absorbent resin comprising subjecting a water-soluble ethylenically unsaturated monomer to reversed phase suspension polymerization in a petroleum hydrocarbon dispersion medium containing a surfactant and a polymeric dispersion agent, the polymeric dispersion agent being a polymeric protective colloid having a weight average molecular weight (Mw) of 2,000 to 15,000 and a molecular weight distribution (Mw/number average molecular weight (Mn)) of 10.0 to 50, wherein the polymeric protective colloid is at least one member selected from the group consisting of maleic anhydride-modified polyethylene, maleic anhydride polypropylene, and maleic anhydride-modified ethylene-propylene copolymers.

2. The process for producing a water-absorbent resin according to claim 1, wherein the surfactant is at least one member selected from the group consisting of fatty acid sucrose esters and polyglycerol fatty acid esters.

3. The process for producing a water-absorbent resin according to any one of claim 1, wherein the water-soluble ethylenically unsaturated monomer is at least one member selected from the group consisting of (meth)acrylic acids and salts thereof.

4. The process for producing a water-absorbent resin according to any one of claim 2, wherein the water-soluble ethylenically unsaturated monomer is at least one member selected from the group consisting of (meth)acrylic acids and salts thereof.

* * * * *